United States Patent [19]

Yoshinari

[11] 4,144,622

[45] Mar. 20, 1979

[54] FLEXIBLE-SHEET FIXING DEVICE

[76] Inventor: Hirota Yoshinari, 773-38 Shimokizaki Oaza, Urawa, Saitama, Japan

[21] Appl. No.: 816,179

[22] Filed: Jul. 15, 1977

Related U.S. Application Data

[63] Continuation-in-part of Ser. No. 628,124, Nov. 3, 1975, Pat. No. 4,057,095.

[51] Int. Cl.² .............................................. A44B 21/00
[52] U.S. Cl. .................................. 24/243 K; 160/392; 160/395
[58] Field of Search .......................... 24/243 K, 261 R; 160/382, 383, 391, 392, 394, 395, 397; 52/63, 222

[56] References Cited

U.S. PATENT DOCUMENTS

| | | | |
|---|---|---|---|
| 783,759 | 2/1905 | Record | 160/392 |
| 975,335 | 11/1910 | Dial | 24/243 K |
| 1,013,531 | 1/1912 | Carmany | 160/391 |
| 3,762,108 | 10/1973 | Pierson | 52/63 |

FOREIGN PATENT DOCUMENTS

| | | | |
|---|---|---|---|
| 235274 | 1/1943 | Switzerland | 24/261 R |
| 1387584 | 3/1975 | United Kingdom | 52/63 |

Primary Examiner—Kenneth J. Dorner

Attorney, Agent, or Firm—McGlew and Tuttle

[57] ABSTRACT

The device is used for fastening sheet material, such as plastic sheeting, to a framework, such as a greenhouse framework, to enclose the framework with the plastic sheeting. The device comprises an elongated channel having, in cross-section, the shape of a dovetail groove, and a zig-zag spring member which is operatively inserted into the channel, after the sheeting has been trained over and into the channel, to serve as a retaining member positively connecting the sheet material to the channels which, in turn, are secured to the framework by bolting or the like. The flanges of the channel are curved at their connection to the base thereof, and the outer edges of the channel are re-entrantly curved to form "pipes" extending longitudinally thereof. The curved edges and the inner curves of the flanges provide for smooth training of the sheeting into the channel and over the edges of the flanges. The zig-zag spring has the appearance, in plan, of a series of "open base" trapezoids with adjacent trapezoids facing in opposite directions and each having a leg in common with the other. The sheet material can be easily removed from the channel by simply pulling on an end of the zig-zag spring therein, to decrease its width, and extracting the spring from the channel. Different thicknesses of sheeting can readily be accommodated.

4 Claims, 5 Drawing Figures

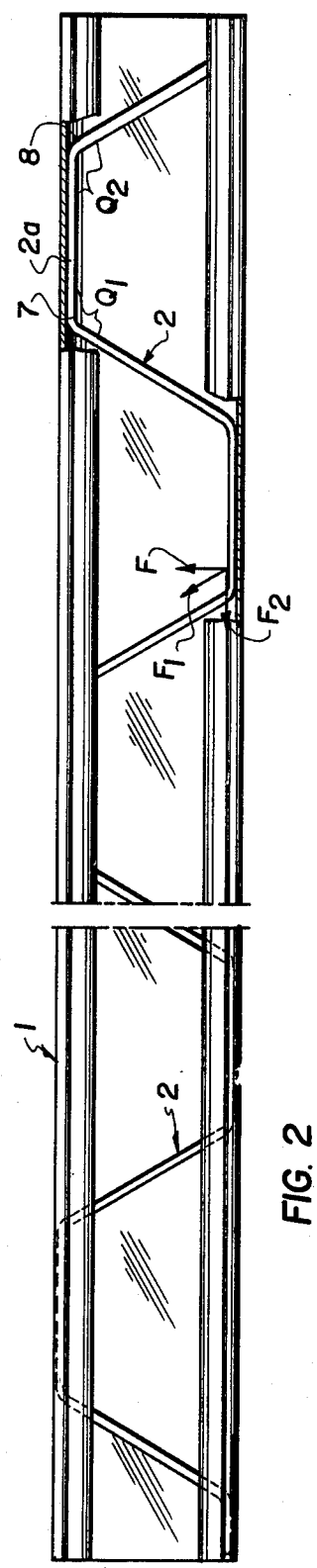
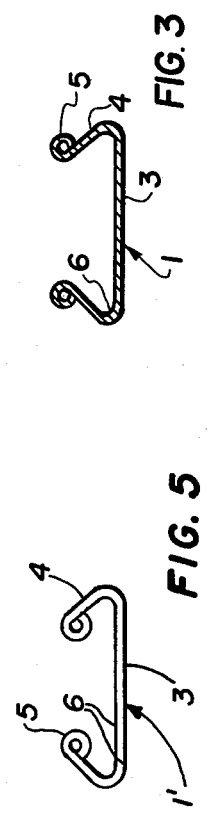
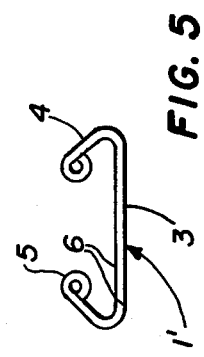
FIG. 2
FIG. 3
FIG. 5

FLEXIBLE-SHEET FIXING DEVICE

CROSS-REFERENCE TO RELATED APPLICATION

This application is a Continuation-In-Part of Appln. Ser. No. 628,124, filed on Nov. 3, 1975, for "FLEXIBLE SHEET FIXING DEVICE", now U.S. Pat. No. 4,057,095.

FIELD AND BACKGROUND OF THE INVENTION

This invention is directed to devices for fixing flexible sheet coverings over a framework and, more particularly, to an improved device greatly facilitating the fixing of such sheetings on the framework, as well as the removal and replacement of such sheetings when necessary or desirable. For example, and using the invention devices for attaching sheeting on the frame of a greenhouse, such as a greenhouse having a plastic framework, the securing of the plastic films on the framework is made much easier and can be effected in one securing action. Furthermore, the devices of the invention can be used for cottage windows to fix both plastic films and mosquito nets thereover in a quick and easy manner and at relatively low cost.

Generally, in constructing a plastic greenhouse, or in constructing any type of pipe house, a large steel frame structure, or a connected house, it is usual to stretch transparent plastic sheets over the roof and sides of the framework so that solar heat may be absorbed into the house through the plastic sheets or sheeting.

However, the work of stretching these plastic sheets or sheeting on the roof framework or side framework of a greenhouse is very difficult. In fact, in fixing the sheets or sheeting by using wires, pressing straps and nails, a great deal of labor and time are required so that the working efficiency is very low. Furthermore, as the duration of plastic sheeting is for two years at the most, such work of stretching a sheeting over the framework must be repeated every two years, following removal of the old sheeting. In addition to the above-mentioned fastening elements, many tools are required to use these elements. As a consequence, it is expensive to stretch and secure plastic sheeting over the framework for a greenhouse, for example.

SUMMARY OF THE INVENTION

A first objective of the present invention is to obviate the above-mentioned problems so that users or constructors may easily stretch and fix plastic sheeting on the framework of houses.

A second objective of the present invention is not only easily to stretch and fix plastic sheeting but also to stretch the sheeting, very stably, and tension the sheeting, so that the sheeting will not become loosened.

A third objective of the present invention is to prevent stretched and fixed sheeting from breaking.

A fourth objective of the present invention is to provide improved devices for stretching sheeting over a framework and requiring the use of only a very few tools.

A further objective of the present invention is to provide a novel device for stretching and fixing sheeting, mosquito nets, and screening over frameworks and for stretching plastic sheeting and metal screening.

In accordance with the invention, the device includes, as one element, an elongated channel of metal, hard plastic, or other similar material. This channel has, in cross-section, the shape of a dovetail groove defined by the base and the two flanges of the channel. The flanges converge toward each other at angles of substantially 45° to the base, and their junctures with the base are in the form of relatively large radius curves. The outer edges of the flanges are re-entrantly curved to form substantially closed pipe-like edges having a relatively large radius of curvature. These pipe-like edges prevent corrosion thereof due to contact with air and moisture, as well as reinforcing the strength of the channel as a whole. The channel base is smooth externally, as are also the channel flanges, so that the base may be smoothly secured to a supporting framework for a greenhouse or the like.

The other element of the device is an undulating or zig-zag highly resilient spring arranged to be inserted into the channel, after vinyl sheeting has been stretched over the edges of the flanges and into contact with the base and flanges of the channel. This undulating spring has, in plan, the shape of a series of trapezoids having "open larger bases". Adjacent trapezoids open in respective opposite directions and have one side leg in common with each other. Additionally, one side leg of each trapezoid forms a larger angle with the smaller upper base of the trapezoid than does the other side leg of each trapezoid, for a purpose described more fully hereinafter.

In using the devices of the present invention, the channels are bolted or otherwise secured to the open framework of a greenhouse or the like, and then sheeting is stretched over and into the channels. After the sheeting is stretched into the channels, the undulating springs are inserted into the channels to firmly hold the sheeting in the channels. Nevertheless, the sheeting can be easily removed by withdrawing the undulating or zig-zag springs from the channels and then removing and replacing the sheeting.

For an understanding of the principles of the invention, reference is made to the following description of a typical embodiment thereof as illustrated in the accompanying drawings.

BRIEF DESCRIPTION OF THE DRAWINGS

In the drawings:

FIG. 2 is a plan view of the device of the invention including the channel and the undulating or zig-zag spring;

FIG. 3 is a cross-sectional view of the channel;

FIG. 5 is an end elevation view of a modified channel.

DESCRIPTION OF THE PREFERRED EMBODIMENT

Figure 4:
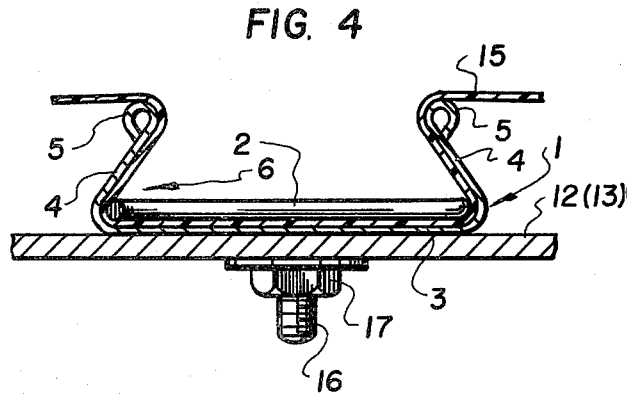
FIG. 4 is a cross-sectional view of the channel, bolted to the framework of FIG. 1, the plastic sheeting stretched over the edges of the channel and into contact with the base and flanges thereof, and the undulating or zig-zag spring.

The sheet fastener embodying the invention, as best seen in FIGS. 2, 3 and 4, comprises a dovetail cross-section channel or side frame 1 and an undulating or zig-zag resilient spring or wire 2 engageable in the channel or side frame 1 to retain sheeting firmly anchored in the channel or side frame. The outer surface of each channel or side frame 1 is finished flat and smooth so that a joint hook or the like can be fitted thereover and neatly engaged with the channel or side frame. The curvatures at the bottom edges of the dovetail groove, where the flanges of the channel join the base thereof, have a radius of curvature of 3 mm so that more than one wire or spring 2 can be held therein for securing vinyl sheeting in and over the channel or side frame. A circular cross-section re-entrant portion is formed on the upper edge of each flange to define a pipe-like member, and this is effeced by so forming the re-entrant portion that its edge firmly engages the exterior surface of the associated flange, in order to prevent corrosion of the re-entrant portion due to contact with air and further to reinforce the strength of the channel or side frame 1.

The resilient wire or spring 2 is formed as a series of trapezoid sections having "open larger bases" with adjacent trapezoidal sections facing in respective opposite directions and having one side leg in common with each other. The two side legs of each trapezoidal section extend at respective different angles to the upper base of the trapezoidal section, so that one side leg makes a larger angle with the upper base than does the other side leg. By virtue of this arrangement, mounting and removal of the resilient wire or spring 2 is facilitated by first engaging the side leg having the larger angle into the channel or side frame 1, and, for removal of the resilient wire or spring, first disengaging the side leg having the larger angle with the upper base.

More particularly, the supporting frame or channel 1 has a longitudinally extending flat base 3 and two flanges 4 which extend outwardly from the opposite edges of base 3 and extend inwardly at an angle of 45° to the surface of base 3. The upper edge of each flange 3 is formed with a substantially circular cross-section re-entrant portion 5 defining a pipe-like shape. The free end of each re-entrant portion 5 closely contacts the outer surface of the associated flange 4. The flanges 4, with the base 1, define a dovetail groove 6 having a corner curvature, at the junctions of the flanges with the base, with a radius of curvature of 3 mm. The dovetail groove 6 extends longitudinally of the channel or side frame 1. The outer surfaces of flanges 4 are made flat and smooth so that hooks or other joining means may be engaged with the flanges in a convenient manner.

Since each edge of the re-entrant portion 5 of each flange, which may be curved either outwardly or inwardly, is so formed as to have its free edge closely engaged with either the outer or inner surface of the associated flange 4 to form a complete pipe-like shape, penetration of wind and rain into the re-entrant portions 5 can be prevented.

While FIGS. 3 and 4 illustrate the re-entrant portions 5 as being exterior to the associated flanges 4, FIG. 5 illustrates a modified channel 1' in which the re-entrant portions 5 extend inwardly relative to the associated flanges 4.

The side frame or channel 1 may be made of metal or hardened plastic, and may be formed by extrusion or a draw-molding method. The curvature of the re-entrant portions 5 is selected to have a radius such as to prevent the sheeting, which extends over the surface of the re-entrant portions 5 and is subject to tensile forces, from stress concentration such as may occur due to the training of the sheeting over the surface of the rounded re-entrant portions 5. Tests have proven that a radius of curvature for re-entrant portions 5 of 2mm is sufficient to prevent such stress concentration on the sheeting trained thereover.

The depth of dovetail groove 6 and the inclination of flanges 4 relative to base 3, as well as the thickness and overall dimensions of side frame or channel 1, and the like, are determined in accordance with the diameter, elasticity and required mechanical strength of the undulating or zig-zag wire 2. It has been confirmed, by tests, that the effective inclination angle of the flanges 4 relative to the base 3 is about 45°.

As best seen in FIG. 2, each trapezoidal section of resilient wire or spring 2 has two inclined sides joining the upper base 2a at respective curved junctures 7 and 8. The included angle $Q_1$ of one juncture 7 is relatively sharp, with the included angle $Q_2$ of the other juncture 8 being relatively blunt, and the two included angles having the relation of $Q_2 > Q_1$. Wire 2, which has an undulating or wave form, is made of a material having high elasticity or spring characteristics, for example, middle or high carbon steel, and, if necessary, wire 2 is subjected to heat treatment to increase its elasticity. While the wave form of wire 2 is illustrated, in FIG. 2, as being trapezoidal, the wave form may be rectangular or other similar shapes. It is important that the height of the trapezoidal sections of wire 2 is made at least equal to and preferably slightly greater than the maximum width of dovetail groove 6. Preferably, the "amplitude of oscillation" of wire 2, or the "height" of the trapezoidal sections, is about 2mm larger than the maximum width of dovetail groove 6, so that vinyl sheeting or the like may be fixed firmly between wire 2 and dovetail groove 6.

The material and thickness of wire 2 is selected in dependence upon the magnitude of the force required to fix the sheeting, such as vinyl sheeting, the elasticity of the sheeting, etc. The length of wire 2 is conveniently about 2 m, but preferably, the length is equal to the unit length of the side frame or channel 1.

For mounting wire 2, after a vinyl sheeting 15 has been inserted into the dovetail groove 6 entrained over the re-entrant portions 5 of side frame or channel 1, wire 2 is pushed into side frame or channel 1 so that the inserted sheeting 15 may be pressed between the horizontal part or upper base 2a of each trapezoidal section of wire 2 and the internal surface of the flanges 4. Thereby, the portion of the vinyl sheeting 15 which has been inserted into dovetail groove 6 of side frame or channel 1 is firmly held and fixed by the elasticity of wire 2 which tends to stretch within dovetail groove 6. The magnitude of the sheet-fixing force is increased when the elasticity of wire 2 is increased.

For removing a vinyl sheeting 15 from the sheet fastener, the end of wire 2 is manually gripped and wire 2 is pulled outwardly out of dovetail groove 6. Thus, wire 2 is subject to a sufficient elastic deformation to be easily pulled out and removed. When mounting wire 2 in dovetail groove 6, one bent portion 8 can be utilized to effectively deflect the wire 2. Because the angle $Q_2$ of this bent portion or juncture 8 is comparatively large or blunt, this portion has a smaller elastic force than that of the other bent portion or juncture 9, and can easily be deformed by hand. Similarly, bent portion or juncture 8 should be first disengaged for easy removal of wire 2 from dovetail groove 6.

On the other hand, once resilient wire or spring 2 is gripped in dovetail groove 6, the other bent portion or juncture 9, having the smaller angle $Q_1$, provides a larger elastic force and thus a large elastic action of wire 2 in gripping the sheeting 15 in dovetail groove 6.

When sheeting 15 is subjected to external force, such as wind pressure, for example, which acts upon upper bases 2a of the trapezoidal sections of the resilient wire or spring 2, this external force F is divided into two components $F_1$ and $F_2$ due to the wave shape of the resilient wire or spring 2. Force component $F_1$ tends to act as the force to push resilient wire or spring 2 into the corners of dovetail groove 6 and prevent sheeting 15 from being stripped off side frame or channel 1. Thereby, the sheet fastener embodying the invention has advantages and effects as described more fully hereinafter.

In the first place, vinyl sheeting can be fastened and stabilized in a highly effective manner. More particularly, vinyl sheeting 15, which is inserted into dovetail groove 6, is continuously secured and fixed by the undulating highly elastic wire 2 along the longitudinal direction of dovetail groove 6, so that the fastening or fixing effect is excellent.

In the second place, the vinyl sheeting can effectively be protected from damage, due to the fact that the sheeting is continuously fastened or fixed by an undulating wire 2 longitudinally of dovetail groove 6. Thus, any difference between the forces acting upon the secured part and the free part of the vinyl sheeting is eliminated. The stress on the vinyl sheet longitudinally of dovetail groove 6, in response to any external force, is even and is never concentrated upon, for example, the bent portions of wire 2. Consequently, there is no danger of the vinyl sheeting being damaged by local stress concentration.

Effective protection of the vinyl sheeting is also provided by the side frame or channel 1 having the shape, in cross-section, of a dovetail groove. Namely, channel 1 has flanges 4 with their outer edges rounded, at an appropriate curvature, to form a pipe-like rounded part 5. When stretched by tensile force over re-entrant portions 5, the vinyl sheeting 15 can never be bent sharply when it is subjected to the tensile force. Thus, there cannot occur any such situation wherein the vinyl sheeting on the edges of the supporting frame or channel 1 is worn off by friction with the edges when the sheeting flutters in a strong wind, so that there is no danger of damaging this sheet portion. Additionally, the re-entrant portions 5 are protected from corrosion since they are so turned as to closely engage either the outer or inner surface of the associated flange 4, thereby preventing entrance of rain or of water.

The side frame or channel 1 has a relatively great strength, as the section modulus thereof is increased by the re-entrant portions 5 formed on the outer edges of each flange, and these reinforce the strength of side frame or channel 1 to the extent that it is useful as a structural member of a plastic framework, for example.

The sheet fastener of the present invention furthermore is economical because only a single undulating wire is needed to firmly and extensively fasten or fix the sheeting longitudinally of the dovetail groove 6. The extremely small nunber of parts also serves to simplify stock control, transportation and other services.

The fastening or fixing of the sheeting can be performed efficiently, as the only necessary work is to push the long undulating resilient wire or spring 2 into dovetail groove 6, so that the work is simple and can be rapidly performed.

Furthermore, the work does not require any skill, as substantially anyone can perform such a simple operation as inserting a vinyl sheeting 15 into a dovetail groove 6 and then fixing the undulating wire 2 upon the sheet within the groove.

A further feature of the sheet fastener is its easy disassembly. When the end of wire 2 is manually pulled out of dovetail groove 6, the wire 2 is easily removed from the groove, thus releasing the sheeting. As mentioned previously, wire 2 can still more easily be removed if the juncture 8 with a larger angle $Q_2$ is first disengaged.

It should be furthermore be noted that it is possible to utilize a plurality of wires 2 in the supporting frame or channel 1, which ensures that any vinyl sheeting can not only be fixed firmly but that the lining may be repeatedly renewed, as well as the fact that plural sheets can be set at the same time.

Figure 1:
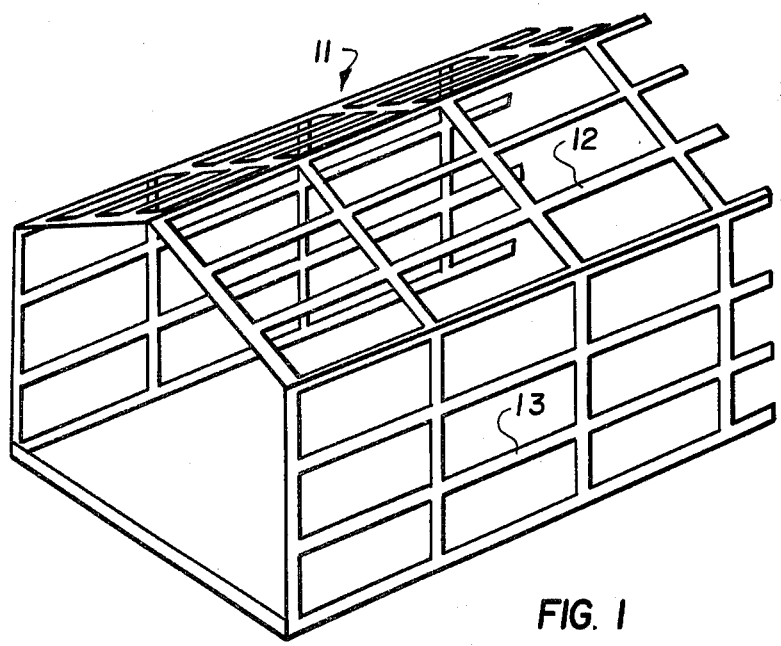
FIG. 1 is a perspective view of the skeleton frame structure of a greenhouse to which the devices of the present invention may be applied.

One example of a plastic framework to which the sheet fastener of the invention may be applied, or may form part thereof, is illustrated in FIG. 1 which shows a skeleton structure or framework 11 of a plastic greenhouse, the skeleton structure or framework 11 including a skeleton roof structure 12 and a skeleton side structure 13.

If the sheet fastener is to be secured to the framework 11, the arrangement is as illustrated in FIG. 4. Referring to FIG. 4, base 3 of channel or side frame 1 is formed with holes spaced longitudinally thereof for the purpose of receiving bolts 16 which, in cooperation with nuts 17, are used to initially secure each channel 1 to the skeleton roof framing 12 and the skeleton wall framing 13, although channels or side frames 1 could be secured to the skeleton framing by other means such as welding or other suitable metal fixtures. The channels 1, thus secured to the skeleton framing, extend longitudinally thereof in spaced parallel relation to each other. To form the "skin" or covering of the skeleton frame 11, the plastic sheeting 15 is stretched over the skeleton structure 11 and into the interior of the channels 1, wherein the stretched plastic sheeting 15 is fixed by insertion of the undulating resilient wire or spring 2 which, due to its resiliency, forces the sheeting into conforming engagement with the interior of each channel or side frame 1, the resilient wire or spring 2 holding the sheeting 15 against the base 3 of each channel 1 and seating in the junctures between the base 3 and the flanges 4 of each channel 1.

While a specific embodiment of the invention has been shown and described in detail to illustrate the application of the principles of the invention, it will be understood that the invention may be embodied otherwise without departing from such principles.

What is claimed is:

1. A sheet fastener for stretching and fixing flexible sheets, said sheet fasterner comprising, in combination, an elongated channel having a substantially flat base and outwardly extending flanges converging toward each other to define, with said base, an outwardly opening groove which has a dovetail shape in cross-section; plural said channels being arranged to be incorporated in a skeleton framework to extend in spaced parallel relation to each other; and an elongated, undulating zig-zag spring resiliently engageable in said dovetail groove adjacent said base, said spring being formed with laterally spaced, longitudinally staggered relatively elongated rectilinear sections interconnected by transversely extending legs with adjacent legs diverging alternately in opposite respective directions; whereby a flexible sheet can be stretched transversely over said channels and into the dovetail grooves thereof and retained in each dovetail groove by insertion of a respective zig-zag spring to hold the sheet, by engagement of said relatively elongated rectilinear sections therewith, in conforming engagement with the interior surfaces of the base and flanges of each channel; the outer edges of said flanges being re-entrantly curled to form a smooth surface for engagement with the flexible sheet; said flanges converging toward each other at respective angles of substantially 45° to said substantially flat base, and having flat and smooth external surfaces; said flanges defining, with said base, curved longitudinal edges of said dovetail groove, said curved longitudinal edges of said dovetail grooves having a radius of curvature of 3mm; the magnitude of undulation of said spring being at least equal to the maximum width of said dovetail groove; each leg joining the associated relatively elongated rectilinear section at a curved juncture therewith; the curved juncture of one leg of each two adjacent legs defining a relatively small angle and the curved juncture of the other leg defining a relatively larger angle.

2. A sheet fastener, as claimed in claim 1, in which said re-entrantly curled outer edges of said flanges have free edges engaging the surfaces of the associated flanges to define a substantially fully closed pipe-like portion on the outer edge of each flange.

3. A sheet fastener, as claimed in claim 2, in which said re-entrantly curled outer edges of said flanges project outwardly from the associated flanges.

4. A sheet fastener, as claimed in claim 2, in which said re-entrantly curled outer edges of said flanges project inwardly from the associated flanges.

* * * * *